(12) United States Patent
Stuart

(10) Patent No.: US 8,463,694 B2
(45) Date of Patent: Jun. 11, 2013

(54) METHOD AND SYSTEM TO ENABLE A FIXED PRICE PURCHASE WITHIN A MULTI-UNIT ONLINE AUCTION ENVIRONMENT

(75) Inventor: Erik Anderson Stuart, San Mateo, CA (US)

(73) Assignee: eBay Inc., San Jose, CA (US)

( * ) Notice: Subject to any disclaimer, the term of this patent is extended or adjusted under 35 U.S.C. 154(b) by 158 days.

(21) Appl. No.: 12/689,153

(22) Filed: Jan. 18, 2010

(65) Prior Publication Data

US 2010/0121733 A1 May 13, 2010

Related U.S. Application Data

(62) Division of application No. 11/167,999, filed on Jun. 28, 2005, now Pat. No. 7,650,307.

(51) Int. Cl.
*G06Q 40/00* (2006.01)
(52) U.S. Cl.
USPC .............................................. 705/37; 705/35
(58) Field of Classification Search
USPC .......................................... 705/35, 36 R, 37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |

(Continued)

FOREIGN PATENT DOCUMENTS

| | | |
|---|---|---|
| CA | 2253543 A1 | 3/1997 |
| FR | 2658635 A1 | 8/1991 |

(Continued)

OTHER PUBLICATIONS

U.S. Appl. No. 09/820,574, 312 Amendment filed Dec. 20, 2006, 8 pgs.

(Continued)

*Primary Examiner* — Ojo O Oyebisi
(74) *Attorney, Agent, or Firm* — Schwegman, Lundberg & Woessner, P.A.

(57) ABSTRACT

A method includes presenting to a buyer a multi-unit auction, permitting the buyer to bid one or more of a price and a number of units in the auction, and permitting the buyer to re-bid in the auction. The auction includes a rule that prevents the buyer from reducing the price in the re-bid, and the auction further includes a rule that prevents the buyer from reducing the number of units in the re-bid.

12 Claims, 14 Drawing Sheets

U.S. PATENT DOCUMENTS

| | | |
|---|---|---|
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A * | 11/1998 | Fisher et al. ............... 705/37 |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,970,470 A | 10/1999 | Walker et al. |
| 5,974,412 A | 10/1999 | Hazlehurst et al. |
| 5,991,739 A | 11/1999 | Cupps et al. |
| 6,035,402 A | 3/2000 | Vaeth et al. |
| 6,044,363 A | 3/2000 | Mori et al. |
| 6,047,264 A | 4/2000 | Fisher et al. |
| 6,047,274 A | 4/2000 | Johnson et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,230,146 B1 | 5/2001 | Alaia et al. |
| 6,243,691 B1 | 6/2001 | Fisher et al. |
| 6,249,772 B1 | 6/2001 | Walker et al. |
| 6,260,024 B1 | 7/2001 | Shkedy |
| 6,536,935 B2 | 3/2003 | Parunak et al. |
| 7,006,987 B1 | 2/2006 | Xie et al. |
| 7,124,107 B1 | 10/2006 | Pishevar et al. |
| 7,124,227 B2 | 10/2006 | Gädeken et al. |
| 7,191,147 B2 | 3/2007 | Heene et al. |
| 7,340,429 B2 | 3/2008 | Maltzman |
| 7,409,360 B1 * | 8/2008 | Lark et al. ............... 705/26.3 |
| 7,647,267 B2 | 1/2010 | Burkhardt et al. |
| 7,650,307 B2 | 1/2010 | Stuart |
| 7,870,058 B2 | 1/2011 | Maltzman |
| 7,873,562 B2 | 1/2011 | Maltzman |
| 2001/0049648 A1 | 12/2001 | Naylor et al. |
| 2002/0026400 A1 | 2/2002 | Narayan et al. |
| 2003/0004850 A1 | 1/2003 | Li et al. |
| 2003/0093355 A1 | 5/2003 | Issa |
| 2004/0254853 A1 | 12/2004 | Heene et al. |
| 2005/0273417 A1 | 12/2005 | Budish |
| 2006/0015436 A1 | 1/2006 | Burns et al. |
| 2006/0190387 A1 | 8/2006 | Molloy |
| 2006/0190388 A1 | 8/2006 | Molloy |
| 2006/0190389 A1 | 8/2006 | Molloy et al. |
| 2006/0190390 A1 | 8/2006 | Molloy |
| 2006/0259406 A1 | 11/2006 | Kemp et al. |
| 2006/0259409 A1 | 11/2006 | Burns et al. |
| 2006/0293994 A1 | 12/2006 | Stuart |
| 2007/0022040 A1 | 1/2007 | Gordon |
| 2007/0088654 A1 | 4/2007 | Maltzman |
| 2008/0015971 A1 | 1/2008 | Maltzman |
| 2008/0133400 A1 | 6/2008 | Molloy |

FOREIGN PATENT DOCUMENTS

| | | |
|---|---|---|
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

U.S. Appl. No. 09/820,574, Examiner Interview Summary filed Aug. 28, 2007, 2 pgs.

U.S. Appl. No. 09/820,574, Examiner Interview Summary mailed Oct. 25, 2005, 4 pgs.

U.S. Appl. No. 10/749,628, Final Office Action mailed Jan. 10, 2008, 8 pgs.

U.S. Appl. No. 10/749,628, Non Final Office Action mailed Jul. 6, 2007, 6 pgs.

U.S. Appl. No. 10/749,628, Non-Final Office Action mailed Jul. 8, 2008, 13 pgs.

U.S. Appl. No. 10/749,628, Non-Final Office Action mailed Dec. 18, 2008, 27 pgs.

U.S. Appl. No. 10/749,628, Response filed Mar. 18, 2009 to Non-Final Office Action mailed Dec. 18, 2008, 11 pgs.

U.S. Appl. No. 10/749,628, Response filed Mar. 27, 2008 to Final Office Action mailed Oct. 11, 2007, 16 pgs.

U.S. Appl. No. 10/749,628, Response filed Oct. 8, 2008 to Non-Final Office Action mailed Jul. 8, 2008, 13 pgs.

U.S. Appl. No. 10/749,628, Response filed Oct. 11, 2007 to Non-Final Office Action mailed Jul. 6, 2007, 15 pgs.

U.S. Appl. No. 11/167,999, Examiner Interview Summary mailed Jul. 9, 2009, 2 pgs.

U.S. Appl. No. 11/167,999, Final Office Action mailed Apr. 2, 2009, 20 pgs.

U.S. Appl. No. 11/167,999, Final Office Action mailed Jun. 2, 2008, 23 pgs.

U.S. Appl. No. 11/167,999, Non-Final Office Action mailed Sep. 25, 2008, 14 pgs.

U.S. Appl. No. 11/167,999, Non-Final Office Action mailed Dec. 13, 2007, 16 pgs.

U.S. Appl. No. 11/167,999, Response filed Mar. 4, 2008 to Non-Finai Office Action mailed Dec. 13, 2007, 14 pgs.

U.S. Appl. No. 11/167,999, Response filed Jul. 13, 2009 to Final Office Action mailed Apr. 2, 2009, 11 pgs.

U.S. Appl. No. 11/167,999, Response filed Aug. 4, 2008 to Final Office Action mailed Jun. 2, 2008, 11 pgs.

U.S. Appl. No. 11/167,999, Response filed Dec. 29. 2008 to Non-Final Office Action mailed Sep. 25, 2008, 10 pgs.

U.S. Appl. No. 11/613,318, Final Office Action mailed Jan. 25, 2010, 18 pgs.

U.S. Appl. No. 11/613,318, Non-Final Office Action mailed Jul. 10, 2009, 12 pgs.

U.S. Appl. No. 11/613,318, Response filed Oct. 12, 2009 to Non Final Office Action mailed Jul. 10, 2009, 10 pgs.

U.S. Appl. No. 11/776,059, Non-Final Office Action mailed Oct. 28, 2009, 17 pgs.

U.S. Appl. No. 11/776,059, Response filed Jan. 28, 2010 to Non Final Office Action mailed Oct. 28, 2009, 10 pgs.

"Europe Gets Online Auction and Haggling Site", *Newbytes News Network*, (May 10, 2000), 2 pgs.

European Application No. 01979435.3 , Office ACtion mailed on Nov. 17, 2009, 13 pgs.

International Application Serial No. PCT/US01/31012 International Search Report mailed Jan. 15, 2002, 7 pgs.

Baumann, G. W, "Personal Optimized Decision/Transaction Program", *IBM Technical Disclosure Bulletin,*, (Jan. 1995), 83-84.

Duey, R., "Supply-Side-E-conomics", *Oil & Gas Investor*, (May 2000), 24-26 pgs.

Hauser, R, "Anonymous Delivery of Goods in Electronic Commerce", *IBM Technical Disclosure Bulletin*, 39(3), (Mar. 1996), 363-366.

Mardesich, Jodi, "Site Offers Clearance for End-of-Life Products—Onsale Takes Auction Gavel Electronic", *Computer Reseller News*, (Jul. 8, 1996), 2 pages.

Williams, G. C, "*San Antonio Express—News* G. Chambers Williams III Column", San Antonio Express—News, (Jul. 8, 2002), 2.

U.S. Appl. No. 09/820,574, Notice of Allowance maiied Apr. 12, 2007, 11 pgs.

U.S. Appl. No. 09/820,574, Advisory Action mailed Mar. 20, 2006, 2 pgs.

U.S. Appl. No. 09/820,574, Appeal Brief filed May 4, 2006, 21 pgs.

U.S. Appl. No. 09/820,574, Comments on Stated Reasons for Allowance filed Jul. 12, 2007, 2 pgs.

U.S. Appl. No. 09/820,574, Examiner Interview Summary filed Nov. 28, 2005, 3 pgs.

U.S. Appl. No. 09/820,574, Examiner Interview Summary mailed Sep. 6, 2007, 3 pgs.

U.S. Appl. No. 09/820,574, Final Office Action mailed Jan. 4, 2006, 18 pgs.

U.S. Appl. No. 09/820,574, Non-Final Office Action mailed Jun. 27, 2005, 19 pgs.

U.S. Appl. No. 09/820,574, Notice of Aliowance mailed Oct. 4, 2007, 8 pgs.

U.S. Appl. No. 09/820,574, Response filed Mar. 6, 2006 to Final Office Action mailed Jan. 4, 2006, 6 pgs.

U.S. Appl. No. 09/820,574, Response filed Nov. 2, 2005 to Non-Final Office Action mailed Jun. 27, 2005, 14 pgs.

U.S. Appl. No. 11/613,318, Response filed Mar. 19, 2009 to Restriction Requirement mailed Feb. 19, 2009, 7 pgs.

U.S. Appl. No. 11/613,318, Restriction Requirement mailed Feb. 19, 2009, 7 pgs.

U.S. Appl. No. 11/776,059, Restriction Requirement mailed Jul. 7, 2009, 7 pgs.

"Autodaq Creates Online Marketplace for Used Auto Industry", *Business Wire*, (Jan. 17, 2000).

"Onsale Joins Fray as Online Shopping Picks Up Speed: Internet Booms", *Computer Reseller News*, CMP Publications, Inc., USA, (Jun. 5, 1995), 1.

"Onsale: Onsale Brings Thrill of Auctions and Bargain Hunting Online; Unique Internet retail service debuts with week-long charity auction for the Computer Museum in Boston", *Business Wire*, Dialog Web. 0489267 BW0022, (May 24, 1995), 3 pages.

"Top: Toys, Bean Bag Plush: Action Figures: Geberal", http://web.archive.org/web.*/http://ebay.com, (Nov. 27, 1999), pp. 3.

Ausubel, L. M, "An Efficient Ascending-Bid Auction for Multiple Objects", *The American Economic Review*, vol. 94, No. 5, (Dec. 2004), 1452-1475.

Budish, Eric B, et al., "Buy Price in online auctions: irrationality on the internet?", *Economics Letters*, (2001), 325-333.

Clemons, E, "Evaluating the prospects for alternative electronic securities", *Proceedings of ICIS 91: 12th International Conference on Information Systems*, (Dec. 16-18, 1991), 53-61.

Graham, I, "The Emergence of Linked Fish Markets in Europe", *Focus Theme*, 1-3.

Gupta, S., et al., "Temporary and Permanent Buyout Prices in Online Auctions", *Working Paper, MIT Sloan School of Management*, (May 23, 2005), 1-12.

Hess, C M, et al., "Computerized Loan Organization System: An Industry Case Study of the Electronic Markets Hypothesis", *MIS Quarterly*, vol. 18(3), (Sep. 1994), 251-274.

Hidvegi, Zoltan, et al., "Buy-price English Auction", (Sep. 1, 2002), 28 Pages.

Hof,, R. D, et al., , *eBay Vs. Amazon.com*, Business Week 3631, (May 31, 1999), 128.

Klein, S. "Introduction to Electronic Auctions", *Focus Theme*, 1-4.

Lee, H G, "AUCNET: Electronic Intermediary for Used-Car Transactions", *Focus Theme*, 1-5.

Lee, H. G, "Electronic brokerage and electronic auction: the impact of IT on market structures". *Proceedings of the Twenty-Ninth Hawaii International Conference on System Sciences*, vol. 4, (1996), 397-406.

Lucking-Reiley, David, "Auctions on the internet: What's being auctioned, and how?", *The journal of industrial economics*, vol. XLVIII, No. 3, (Sep. 2000), 227-252.

Malone, T,, et al., "Electronic Markets and Electronic Hierarchies", *Communications of the ACM*, (Jun. 1987), vol. 14, Issue 25.

Massimb, Marcel, "Electronic Trading, Market Structure and Liquidity", *Financial Analysts Journal*, 50(1), (Jan./Feb. 1994), 39-50.

Mathevvs, Timothy, "A Risk Averse Seller in a Continuous Time Auction with a Buyout Option", (Sep. 12, 2002), 26 Pages.

McAdams, D. L, "Essays in Multi-Unit Auction Theory", *Ph.D. Dissertation, Stanford University Graduate School of Business*, (May 2001), 95-126.

Meade, J., "Visual 360: A Performance Appraisal System That's 'Fun'", *HR Magazine*, Society for Human Resource Management., (Jul. 1999), 3 pgs.

Milgrom, Paul, "Putting Auctions Theory to work : The Simultaneous ascending Auction", *The Journal of Political Economy*, vol. 180, No. 2, (Apr. 2000), 245-272.

Neo, B S, "The implementation of an electronic market for pig trading in Singapore", *Journal of Strategic Information Systems*; vol. 1(5), (Dec. 1992), 278-288.

Post, D L, et al., "Application of auctions as a pricing mechanism for the interchange of electric power", *IEEE Transactions on Power Systems*, 10(3), (Aug. 1995), 1580-1584.

Preist, Chris, et al., "Adaptive Agents in a Persistent Shout Doubie Auction", *International Conference on Information and Computation Economies, Proceedings of the first international conference on Information and computation economics*, (1999), 11-18.

Reck, M., "Formally Specifying an Automated Trade Execution System", *The Journal of Systems and Software*, 1993, Elsevier Science Publishing, USA, (1993), 245-252.

Reck, Martin, "Trading-Process Characteristics of Electronic Auctions", *Focus Theme*, 1-7.

Resnick, Paul, "Reputation systems", *Communications of the ACM*, 43(12), (Dec. 2000), 45-48.

Reynolds, Stanley S, et al., "Ascending Bid Auctions with a Buy-Now Price", (Aug. 2002), 29 Pages.

Rockoff, T E, et al., "Design of an Internet-based system for remote Dutch auctions", *Internet Research: Electronic Networking Application and Policy*, vol. 5(4), (Jan. 1, 1995), 10-16.

Schmid, B F, "The Development of Electronic Commerce", *EM—Electronic Markets*, No. 9-10, (Oct. 1993), 2 pgs.

Siegmann, Ken, "Nowhere to go but up", *PC Week*; vol. 12(42), Ziff-Davis Publishing Company, (Oct. 23, 1995), 1-3.

Steiner, Ina, "From the Editor", *Auction Bytes newsletter, Autionbytes—Update*, No. 8, ISSN 1529-6703, (Feb. 20, 2000), 2 Pages.

Tjostheim, Ingvar, "A case study of an on-line auction for the World Wide Web", *Norwegian Computing Center (NR)*, 1-10.

Turban, E, "Auctions and Bidding on the Internet: An Assessment", *Focus Theme*, 1-5.

Van Heck, E., et al., "Experiences with Electronic Auctions in the Dutch Flower Industry", *Focus Theme, Erasmus University*, The Netherlands.

Wang, X., et al., ""When Auction Meets Fixed Price: A Theoretical and Empirical Examination of Buy-it-Now Auctions,"", working paper retrieved from the Internet Archive, (Jun. 2004).

Warbelow, A, et al., "Aucnet: TV Auction Network System", *Harvard Business School Case/Study*, HBVR#9-190-001, USA, (Jul. 1989), 1-15.

Zwass, V., "Electronic Commerce: Structures and Issues", *International Journal of Electronic Commerce*, Fall 1996, vol. 1, No. 1, (Fall 1996), 3-23.

U.S. Appl. No. 11/167,999, Notice of Aliowance maiied Sep. 2, 2009, 9 pgs.

U.S. Appl. No. 11/613,318, Advisory Action mailed Apr. 6, 2010, 3 pgs.

U.S. Appl. No. 11/613,318, Examiner interview Summary mailed Jul. 2, 2010, 2 pgs.

U.S. Appl. No. 11/613,318, Notice of Allowance mailed Sep. 7, 2010, 7 pgs.

U.S. Appl. No. 11/613,318, Response filed Mar. 25, 2010 to Final Office Action mailed Jan. 25, 2010, 11 pgs.

U.S. Appl. No. 11/613,318, Supplemental Amendment filed Aug. 2, 2010, 6 pgs.

U.S. Appl. No. 11/776,059, Final Office Action mailed May 13, 2010, 9 pgs.

U.S. Appl. No. 11/776,059, Notice of Allowance mailed Sep. 8, 2010, 10 pgs.

U.S. Appl. No. 11/776,059, Response filed Aug. 6, 2010 to Final Office Action mailed May 13, 2010, 8 pgs.

\* cited by examiner

SELL YOUR ITEM   RELATED   • NEW TO SELLING?  • SELLER TIPS  • FEES  • REGISTRATION
                LINKS :    • FREE SHIPPING ESTIMATES FROM ISHIP.COM

– YOUR USER ID : [          ]
              YOU CAN ALSO USE YOUR EMAIL ADDRESS.

YOUR PASSWORD: [          ]

TITLE REQUIRED    [                              ]
                  (45 CHARACTERS MAX; NO HTML TAGS, ASTERISKS, OR QUOTES,
                   AS THEY INTERFERE WITH SEARCH) SEE TIPS

CATEGORY (CHOOSE ONE CATEGORY ONLY; BE AS SPECIFIC AS POSSIBLE.) REQUIRED
ANTIQUES & ART :
[                              ▼]

DESCRIPTION REQUIRED
[                                                        ]

513 —
| BUY IT NOW    NEW! | BUY IT NOW–SPECIAL HOLIDAY PROMOTION |
| SELL YOUR ITEM INSTANTLY TO THE FIRST BUYER WHO MEETS YOUR SPECIFIED PRICE. | FREE DURING HOLIDAY PROMOTION<br>$ [        ] ENTER THE BUY IT NOW PRICE<br>E.G. 20.00 --- PLEASE DO NOT INCLUDE COMMAS OR CURRENCY SYMBOLS, LIKE $.  |
| THE BUY IT NOW PRICE IS ONLY AVAILABLE BEFORE BIDS APPEAR. LEARN MORE | BUY IT NOW IS NOT CURRENTLY AVAILABLE FOR MULTIPLE ITEM AUCTIONS.<br><br>WE RECOMMENDED BUY IT NOW WITH INSTANT PURCHASE THROUGH EBAY ONLINE PAYMENTS (AVAILABLE BELOW.) |

514 points to the Buy It Now price field.

[    ] [SEARCH] TIPS

☑ SEARCH ONLY IN COLLECTIBLES

☐ SEARCH TITLES AND DESCRIPTIONS

UPDATED : OCT 13, 2000
06:31:09
PDT

RELATED TOPICS: CHINA & POTTERY THEME PAGE | DEPT 56 | GLASS

1069 BELLS ITEMS IN ALL

| ALL ITEMS | ALL ITEMS INCLUDING GALLERY PREVIEW | GALLERY ITEMS |

| STATUS | FEATURED ITEMS - CURRENT | PRICE | BIDS | ENDS PDT |

THERE ARE NO FEATURED ITEMS IN THIS CATEGORY.
TO FIND OUT HOW TO BE LISTED IN THIS SECTION AND SEEN BY THOUSANDS, PLEASE VISIT THIS LINK
FEATURED AUCTIONS

| STATUS | CURRENT ITEMS - CURRENT | BUY-IT-NOW PRICE | BIDS | ENDS PDT |
|---|---|---|---|---|
| 📷 | 2 GOLD ALPINE BELLS, MEDIUM AND SMALL | $3.99 | – | 10/23 06:15 |
| 📷 | PICKARD CHINA 1980 CHRISTMAS BELL | $15.00 | – | 10/20 06:07 |
| 📷 | CROWN AND ROSE 1979 XMAS BELL PEWTER | $12.00 | – | 10/20 06:06 |
| 📷 | CROWN AND ROSE 1978 PEWTER CHRISTMAS BELL, #1 | $9.95 | – | 10/20 06:05 |
| 📷 | KAISER (GERMANY) 1981 ANNUAL CHRISTMAS BELL | $12.00 | – | 10/20 06:05 |
| 📷 | KAISER 1980 CHRISTMAS BELL IN WHITE BISQUE | $12.00 | – | 10/20 06:05 |
| 📷 | KAISER (GERMANY) 1979 ANNUAL CHRISTMAS BELL | $8.00 | – | 10/20 06:04 |
| 📷 | KAISER COBALT BLUE 1978 XMAS BELL, GERMANY | $8.00 | – | 10/20 06:04 |
| 📷 | THREE BELL(S) SOME COLLECTIBLE; LOW PRICE | $5.00 | – | 10/20 06:03 |
| 📷 | LARGE CRYSTAL BELL WITH FOUR WOMEN | $9.99 | – | 10/20 04:47 |

| DESCRIPTION |
| --- |
| I HAVE A BEGINNING POTTERY SHACK TRAY IT IS MARKED ON BACK. IT IS IN MINT |
| FREE HONESTY COUNTERS IMAGE HOSTING, LISTING TOOLS AND MESSAGE BOARDS |
| BIDDING |

BENNINGTON POTTERY TRAY
ITEM #430507896

OPENING BID : $8.99
YOUR MAXIMUM BID : [ ]
520
(MINIMUM BID: $8.99)

[ REVIEW BID ]

EBAY WILL BID ON YOUR BEHALF UP TO YOUR MAXIMUM BID, WHICH IS KEPT SECRET FROM OTHER THIS IS CALLED PROXY BIDDING.

YOUR BID OR PURCHASE IS A CONTRACT – BUY OR PLACE A BID ONLY IF YOU ARE SERIOUS ABOUT THE ITEM. IF YOU ARE THE WINNING BIDDER, YOU WILL ENTER INTO A LEGALLY BINDING CONTRACT TO PURCHASE THE ITEM FROM THE SELLER.
BUY IT NOW NO LONGER AVAILABLE – THIS ITEM WAS LISTED WITH A BUY IT NOW PRICE WHICH IS NO LONGER AVAILABLE SINCE BIDDING HAS STARTED. LEARN MORE

HOW TO BID

1. REGISTER TO BID – IF YOU HAVEN'T ALREADY. IT'S FREE!

2. LEARN ABOUT THIS SELLER – READ FEEDBACK COMMENTS LEFT BY OTHERS.

3. KNOW THE DETAILS – READ THE ITEM DESCRIPTION AND PAYMENT & SHIPPING TERMS CLOSELY.

4. IF YOU HAVE QUESTIONS – CONTACT THE SELLER INWINNING BEFORE YOU BID.

5. PLACE YOUR BID!

EBAY PURCHASES ARE INSURED.

BUY IT NOW PRICE : $52.00

504

YOUR USER ID : [ ]
    YOU CAN ALSO USE YOUR EMAIL ADDRESS.

YOUR PASSWORD: [ ]
    FORGOT YOUR PASSWORD?

SAVE TIME BY SIGNING IN. (YOU MAY ALSO SIGN IN SECURELY)

[ BUY IT NOW ] ON THE NEXT PAGE, YOU'LL BE ASKED FOR CREDIT CARD OR ALTERNATIVE VERIFICATION IF YOUR CARD IS NOT ALREADY ON FILE WITH US.
YOUR CREDIT CARD WILL NOT BE CHARGED.

YOUR PURCHASE IS A CONTRACT – BUY ONLY IF YOU'RE SERIOUS ABOUT THE ITEM. YOU WILL ENTER INTO A LEGALLY BINDING CONTRACT TO PURCHASE THE ITEM FROM THE SELLER.

*FIG. 9*

METHOD AND SYSTEM TO ENABLE A FIXED PRICE PURCHASE WITHIN A MULTI-UNIT ONLINE AUCTION ENVIRONMENT

RELATED APPLICATION

This application is a divisional of U.S. patent application Ser. No. 11/167,999, filed Jun. 28, 2005 now U.S. Pat No. 7,650,307, which is incorporated herein by reference in its entirety.

FIELD OF THE INVENTION

The present invention relates generally to the field of e-commerce and, more specifically, to a pre-auction seller determined price for an Internet-based multi-unit auction facility.

BACKGROUND OF THE INVENTION

Many Internet-based auction facilities have developed in the past several years. Through Internet-based auction facilities, potential sellers can enter information about their product or service for potential buyers to bid on. The information submitted by potential sellers is then organized and stored by the Internet-based auction facility. Potential buyers can search through the organized seller information to find products or services they wish to bid on.

Once a buyer locates an item to bid on, the buyer can compete with other buyers for the item by submitting bids during a specified auction time period. At the end of the specified auction time period, the highest bid buyer is notified and the transaction between the seller and the highest bid buyer is facilitated.

While the current Internet-based auction facility works well for some items, there are several disadvantages. For example, many items in an Internet-based auction facility have at most one bid during the specified auction time. An interested buyer must sometimes wait days for an auction to end even though his bid is the only bid received. Also, there are many potential buyers who don't like auction formats.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary seller interface to receive information on seller's offerings.

FIG. 7 illustrates an exemplary buyer interface to facilitate a buyer in locating items to purchase or bid on.

FIG. 8 illustrates an exemplary item list generated in response to buyer's category selection or search criteria provided in the user interface of FIG. 7.

FIG. 9 illustrates an exemplary buyer interface used to receive buyer information including an indication to use the fixed-price purchase process or the auction purchase process.

FIG. 10 illustrates an exemplary method in which a fixed-price option is available in a multi-unit auction as long as items have not been bid on.

DETAILED DESCRIPTION

A method and system for providing an option to sell and buy at a pre-auction seller determined price in an Internet-based auction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
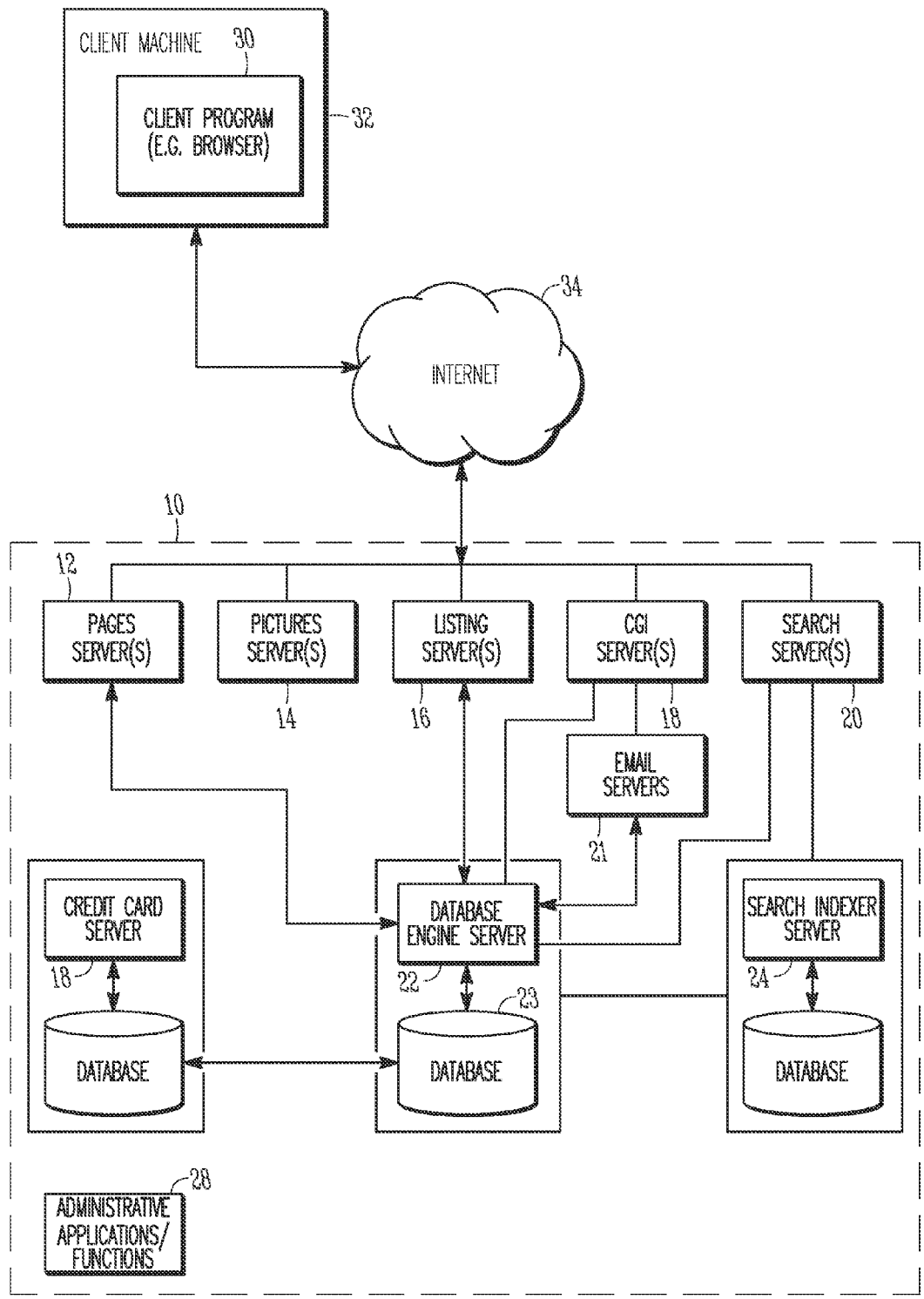
FIG. 1 is a block diagram illustrating an exemplary network-based transaction facility in the form of an Internet-based auction facility.
Figure 2:
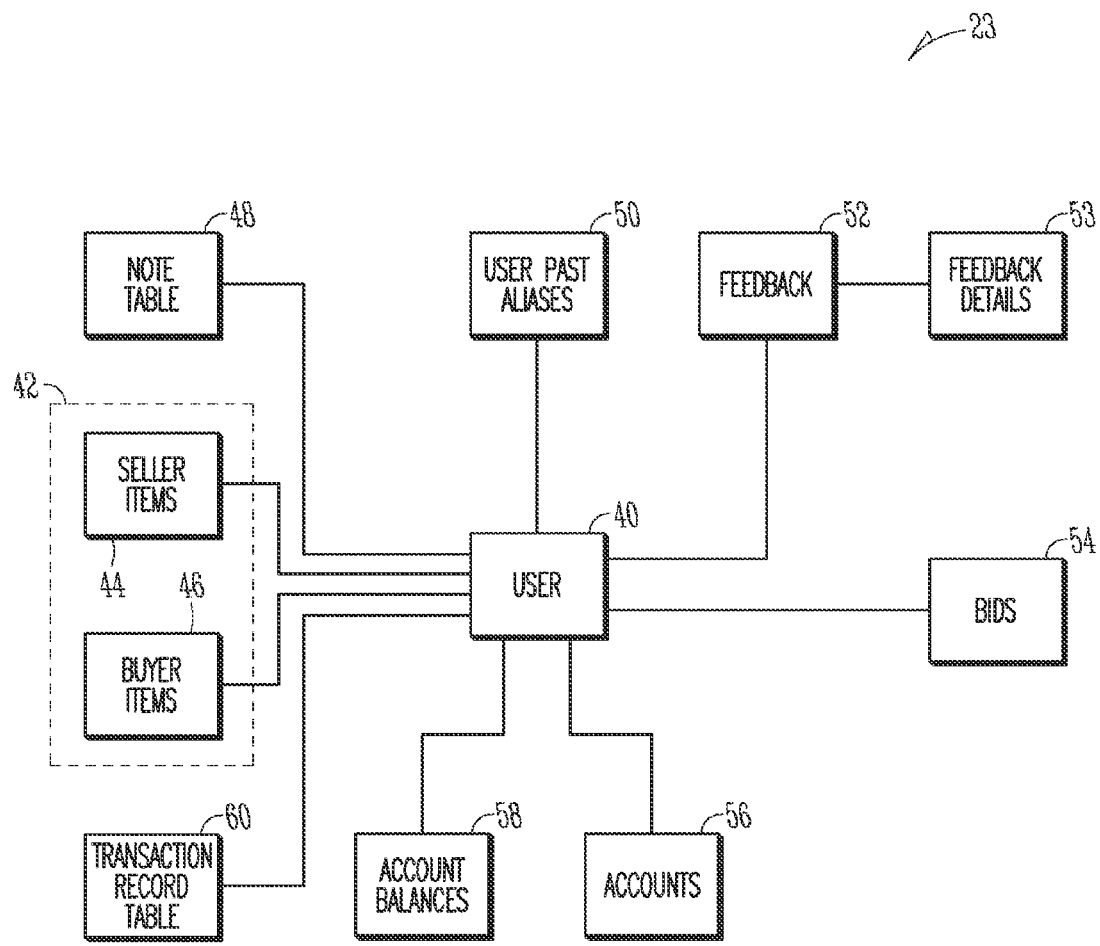
FIG. 2 is a database diagram illustrating an exemplary database for the transaction facility.

To better understand the invention, an embodiment of an electronic transaction facility is shown in FIGS. 1 and 2.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities. It will also be appreciated by those skilled in the art that the invention may be used in auction facilities of other architectures. The instructions stored in the auction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of auction facility 10, and search servers 20 that handle search requests to the auction facility 10. E-mail servers 21 provide, inter alia, automated e-mail communications to users of the auction facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond Wash.) that executes on a client machine 32 and accesses the auction facility 10 via a network such as, for example, the Internet 34. Other examples of networks that a client may utilize to access the auction facility 10 include a wide area network (WAN), a local area network (LAN), a wireless network (e.g. a cellular network), or the Plain Old Telephone Service (POTS) (or PSTN) network.

Database Structure

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of blocks in a block-oriented database. While FIG. 2 shows one embodiment of a database, it will be appreciated by those skilled in the art that the invention can be used with other database structures.

Central to the database 23 is a user table 40, which contains a record for each user of the auction facility 10. A user may operate as a seller, buyer, or both, within auction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned via the auction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned via the auction facility 10 or to a user of the auction facility 10.

A number of other tables are also shown to be linked to the user table 40, namely a user past aliases table 50, a feedback table 52, a bids table 54, an accounts table 56, and an account balances table 58.

Figure 3:
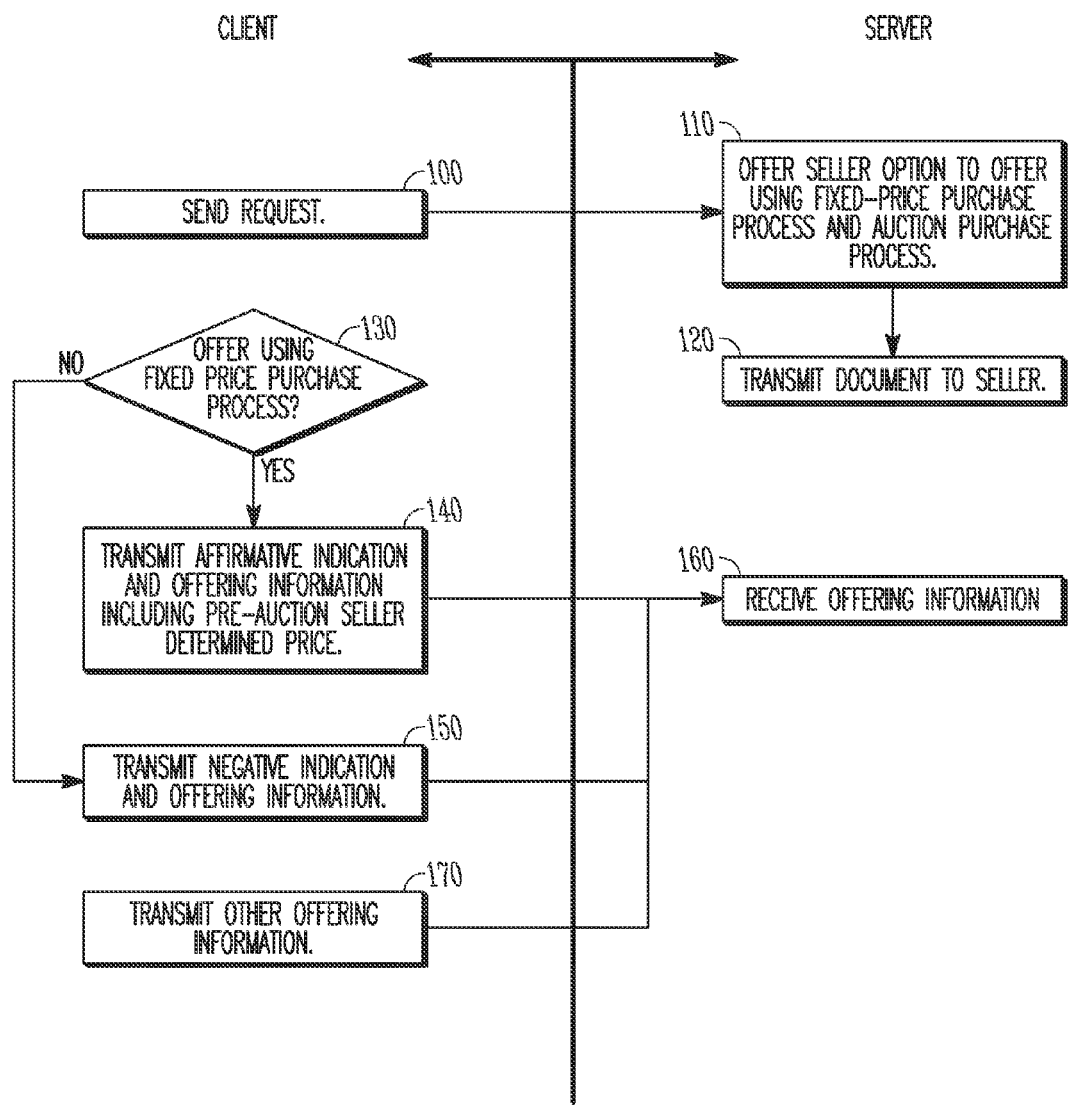
FIG. 3 is a flow chart illustrating an exemplary method of receiving offering information from a seller including whether to offer the item at a pre-auction seller determined price.

FIG. 3 shows a flowchart for an exemplary embodiment of a method to acquire offering information from a seller. The seller issues a listing request (block 100) to the auction facility 10, and the auction facility generates instructions (block 110) offering the seller the option to sell his item using an auction purchase process option and/or a fixed-price purchase process option. After the instructions have been transmitted (block 120), and a page server 12 (see FIG. 1) displays the instructions, the seller decides whether to offer a buyer the chance to buy the offering at a pre-auction seller determined price in a fixed-price purchase process. The seller transmits a purchase process indicator by either an affirmative (block 140) or a negative (block 150). The server can receive and store in note table 48 of database 23 (FIG. 2) this information for later use (block 160). The seller also transmits other offering information, such as a description, picture, reserve price, and contact information to be collected and stored in note table 48 of database 23 (see FIG. 2) (block 160). Optionally, if the seller sends a pre-auction seller determined price that is less than the reserve price he or she sends, the seller can be notified of an error.

Figure 4:
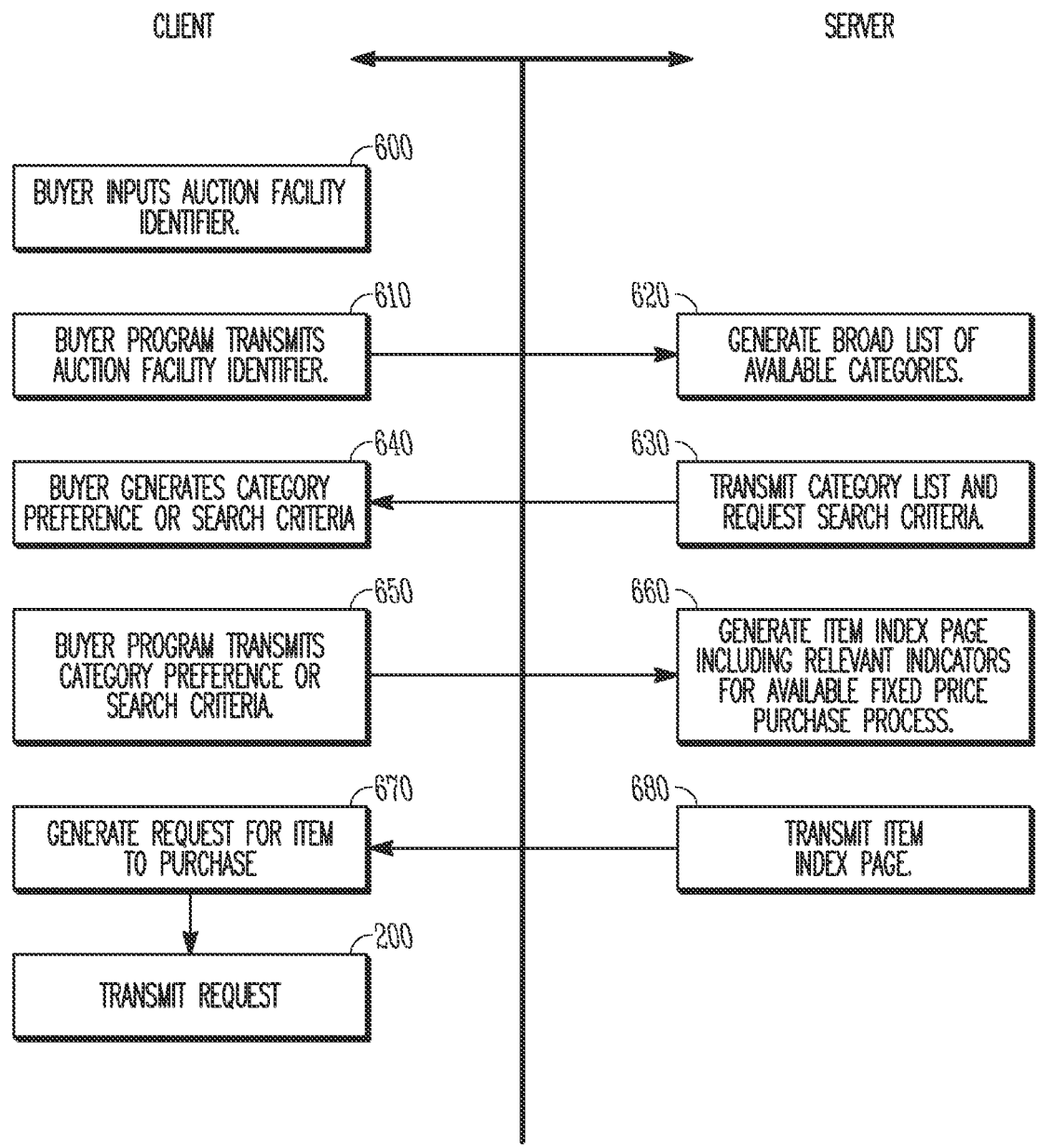
FIG. 4 is a flow chart illustrating an exemplary method of generating a buyer preferred index page using category preferences or search criteria.

FIG. 4 shows a flow chart showing one embodiment of a buyer's interaction with the Internet-based auction facility. The buyer locates the site by inputting the auction facility identifier (block 600) into the client program 30 running on client machine 32 (see FIG. 2) which transmits the auction facility identifier (block 610) through the Internet 34 (See FIG. 1). The Internet-based auction facility receives the transmission and (block 620) a listing server 16 (see FIG. 1) generates a broad list of available categories of items stored in items table 42 (see FIG. 2) for the buyer to select from. The auction facility 10 (block 630) transmits the category list and transmits an interface, which can be presented by a page server 12 (see FIG. 1), to allow the buyer to enter search criteria which may be independent of the category list. The buyer selects a category preference from the category list or generates a search criteria (block 640). The buyer then transmits (block 650) the category preference or search criteria, again, through the Internet 34 (see FIG. 1). Upon receipt of the category preference or search criteria, the auction facility uses a search server 20 (see FIG. 1) to generate an item index page of relevant offerings including visual indicators displayed in respect to items in which the seller is allowing a buyer to buy the item at a pre-auction seller determined price (block 660). The item index page is transmitted to the buyer (block 680). After receiving the item index page (block 670), the buyer generates a request for an item to purchase or bid on. Picture servers 14 (see FIG. 1) can also be used to show the buyer pictures (if available) of the item. The buyer's request is then transmitted (block 20).

Figure 5A:
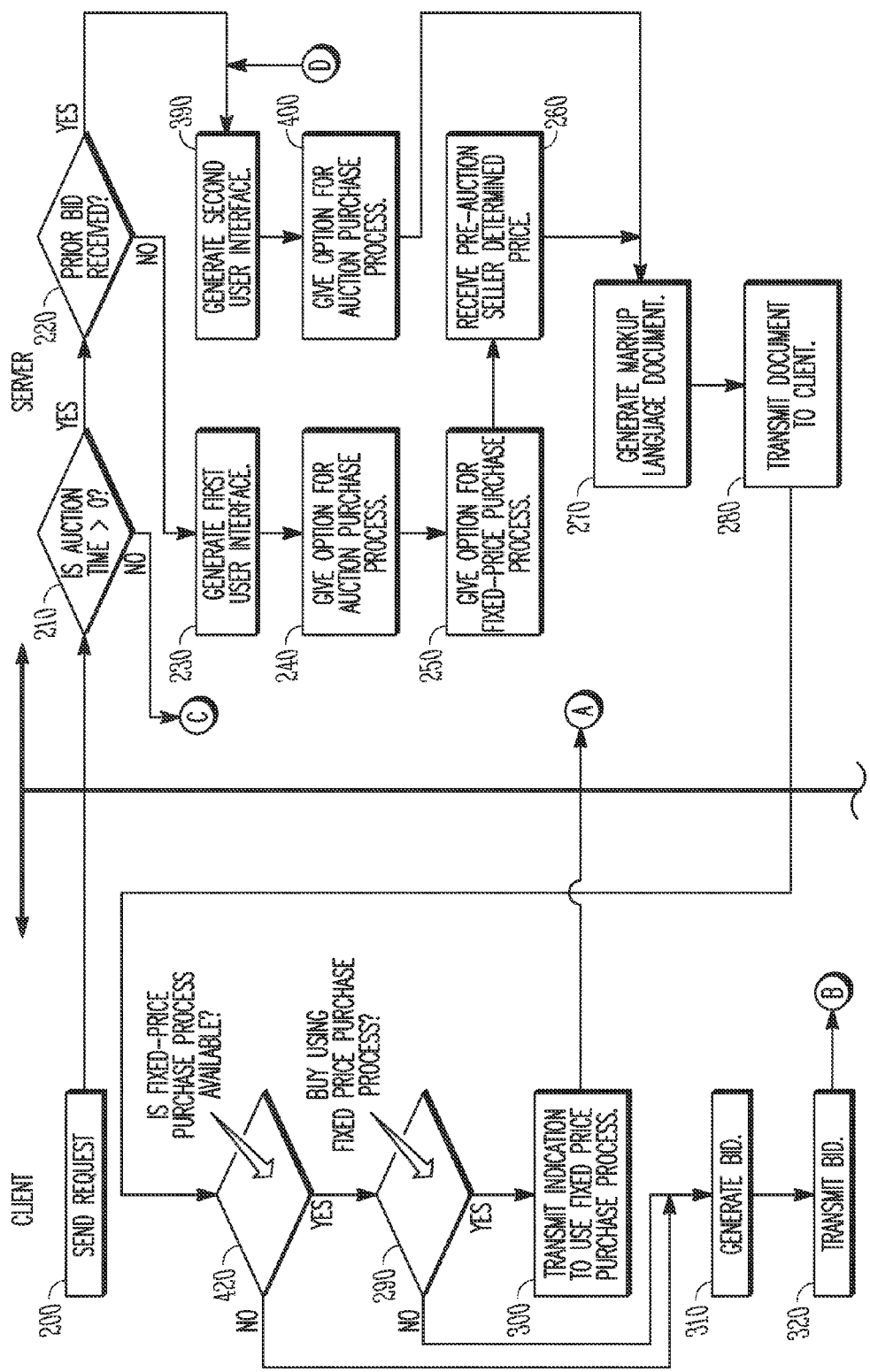
FIGS. 5A and 5B are flow charts illustrating an exemplary method of displaying user interfaces for and conducting an auction facility with an auction purchase process and optionally a fixed-price purchase process.
Figure 5B:
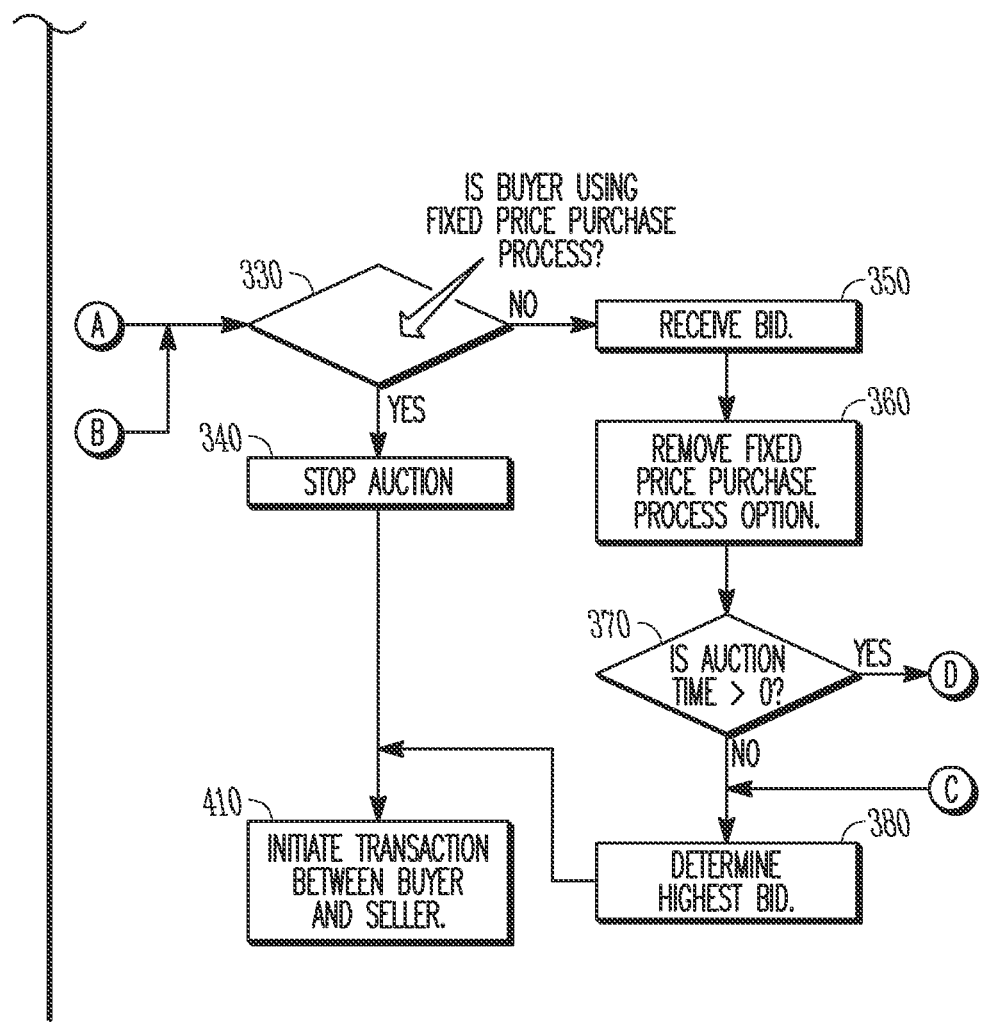

FIG. 5 shows a flow chart illustrating how the client interfaces with the auction facility, located on a first computer system, when a pre-auction seller determined price is an alternative option to bidding. After the facility receives the buyer's request (block 200), decision block 210 decides if there is still time remaining in the item's auction (item requested by the buyer). If a predetermine period of time has passed, the buyer will not be allowed to place a bid or buy at the pre-auction seller determined price. Instead the auction will end and the highest bidder (if there is one) will be determined (block 380). If there is time remaining, then the determination is made in decision block 220 whether a prior bid has been received. If a prior bid has been received, then the pre-auction seller determined price is no longer available to the buyer and the buyer's only option is to bid. If no prior bid has been received, and the item has a pre-auction seller determined price available, a first user interface will be created (block 230). The auction facility 10 will make the typical auction purchase process available through the user interface (block 240) and will make the fixed price purchase process available to the client (block 250). The pre-auction seller determined price is retrieved for the user interface (block 260). The first user interface is converted into a markup language document suitable for viewing by the buyer (block 270). The generated markup language document is then transmitted for viewing by the buyer on a second computer system using page servers 12 on the first computer system (block 280) (see FIG. 1).

If, at decision block 220, it is determined that an initial bid value has been received, a second user interface will be generated (block 390). The typical auction purchase process is then made available through the user interface (block 400). The second user interface is converted into a markup language document suitable for viewing by the buyer (block 270). The generated markup language document is then transmitted to the buyer (block 280).

After the markup language document has been transmitted to the buyer, a determination is made at decision block 420, based on the transmitted markup language document whether the fixed price purchase process is available to the buyer. If the fixed price purchase process is available to the buyer, the buyer then makes a determination at decision block 290 whether to buy the item at the pre-auction seller determined price or whether to bid on the item. If the buyer chooses to purchase the item using the fixed price purchase process, his indication to buy at the pre-auction seller determined price is transmitted to the auction facility.

If the fixed price purchase process is not available to the buyer (as determined in decision block 420) or fixed price purchase process is available, but the buyer chooses not to use the fixed price purchase process, the buyer generates a bid (block 310). The bid is then transmitted to the auction facility (block 320).

Upon receiving a transmission from the buyer, a determination is made at decision block 330 whether the buyer has chosen the fixed price purchase process. If the buyer has chosen the fixed price purchase process, the auction is stopped (if the quantity in the auction is fully sold) (block 340) and a transaction is initiated between the buyer and the seller (block 410). Optionally, the auction facility can check the buyer's credit before stopping the auction.

If the buyer has not opted to use the fixed price purchase process, as determined by the auction facility at decision block 330 (either because it wasn't available or he or she preferred to place a bid instead), the bid is received (block 350). Optionally, if the bid is greater than the pre-auction seller determined price (and the fixed price purchase process is still available), the auction facility may invite the buyer to use the fixed price purchase process. Upon receipt of the bid, the fixed price purchase process option is removed (block 360) and a determination is made at decision block 370 to see if there is any time remaining in the auction. If there is time remaining in the auction, bids can be received and processed in the above manner until there is no more time remaining in the auction. However, if there is no more time remaining in the auction, the highest valid bid is determined from the received bids (block 380), and a transaction is initiated between the highest bidder and the seller (block 410).

FIG. 6 provides an exemplary embodiment of the user interface 500 created at block 110 in FIG. 3 to relay offering options to the seller and collect information on the seller's item. The user interface 500 gives the seller the option to allow a buyer to buy the item at a pre-auction seller determined price 514.

Figure 7:
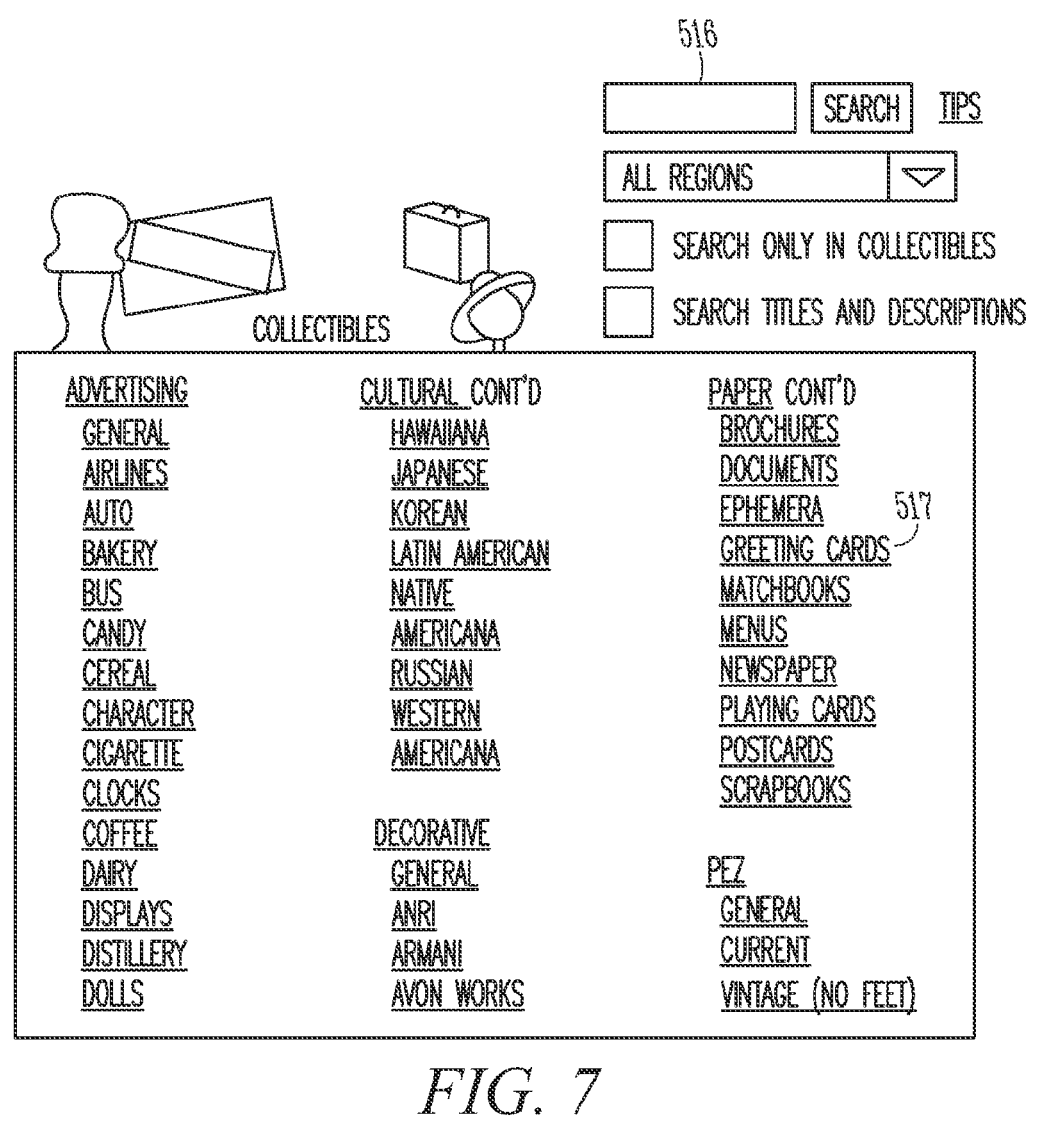

FIG. 7 provides an exemplary embodiment of the category list 517 and search criteria request generated by object 620 in FIG. 4. A buyer can generate search criteria (block 640) by typing the search criteria (block 516).

FIG. 8 provides an exemplary embodiment of the item index page generated at block 660 in FIG. 4. A possible placement of the fixed-price purchase process availability icon 518 is shown next to the item. Also displayed in the embodiment of the item index page is a list of prices 514 which could either be the current bid or the pre-auction seller determined price if available.

FIG. 9 shows an exemplary embodiment of, the markup language document generated at block 270 in FIG. 5. Regular auction panel 503 is generated (blocks 240 and 400). Fixed price purchase process panel 504 is generated (block 250) in FIG. 5. The buyer can submit a bid 520 or, depending on the availability of the fixed price purchase process, can start the fixed price purchase process in panel 504.

In an embodiment, the option of purchasing an auction item at a fixed price in a single-item auction is extended to purchasing one or more units of an item at a fixed price in a multi-unit auction (also known as a Dutch auction). In either the single item or multi-unit auction, this option to purchase an item at a fixed price may be referred to as a Buy-It-Now (BIN) feature. In different embodiments, the availability of the BIN feature over the course of the auction may change. In one embodiment of the BIN feature, the BIN feature is persistent, or in other words, available throughout the entirety of the auction. In other embodiments of this BIN feature, the BIN feature disappears after certain conditions are met.

Figure 10:
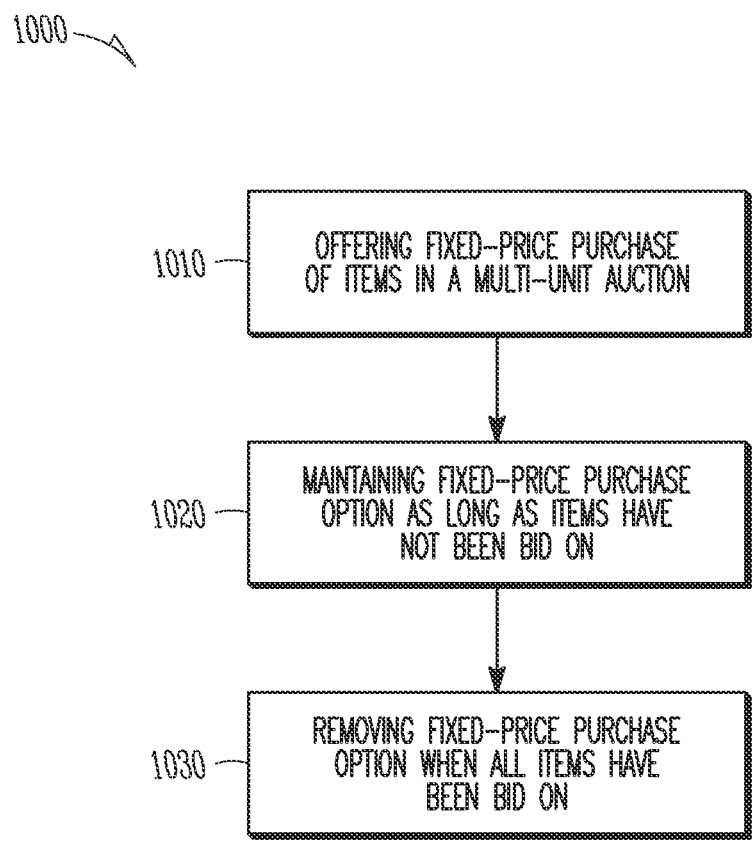

An embodiment of a process 1000 in which the BIN features disappears during the course of an auction is referred to as a temporary BIN and is illustrated in FIG. 10. In the temporary BIN embodiment, a fixed-price purchase option is made available in a multi-unit auction at 1010, and the BIN feature remains available throughout the auction for any units that have not yet been bid on (1020). For example, if 10 units of an item are available in an auction, and Bidder A bids on three units, and Bidder B bids on two units, then five units remain available for BIN purchase. When all the units have been bid on, the fixed-price purchase option is removed from the auction at 1030.

Figure 11:
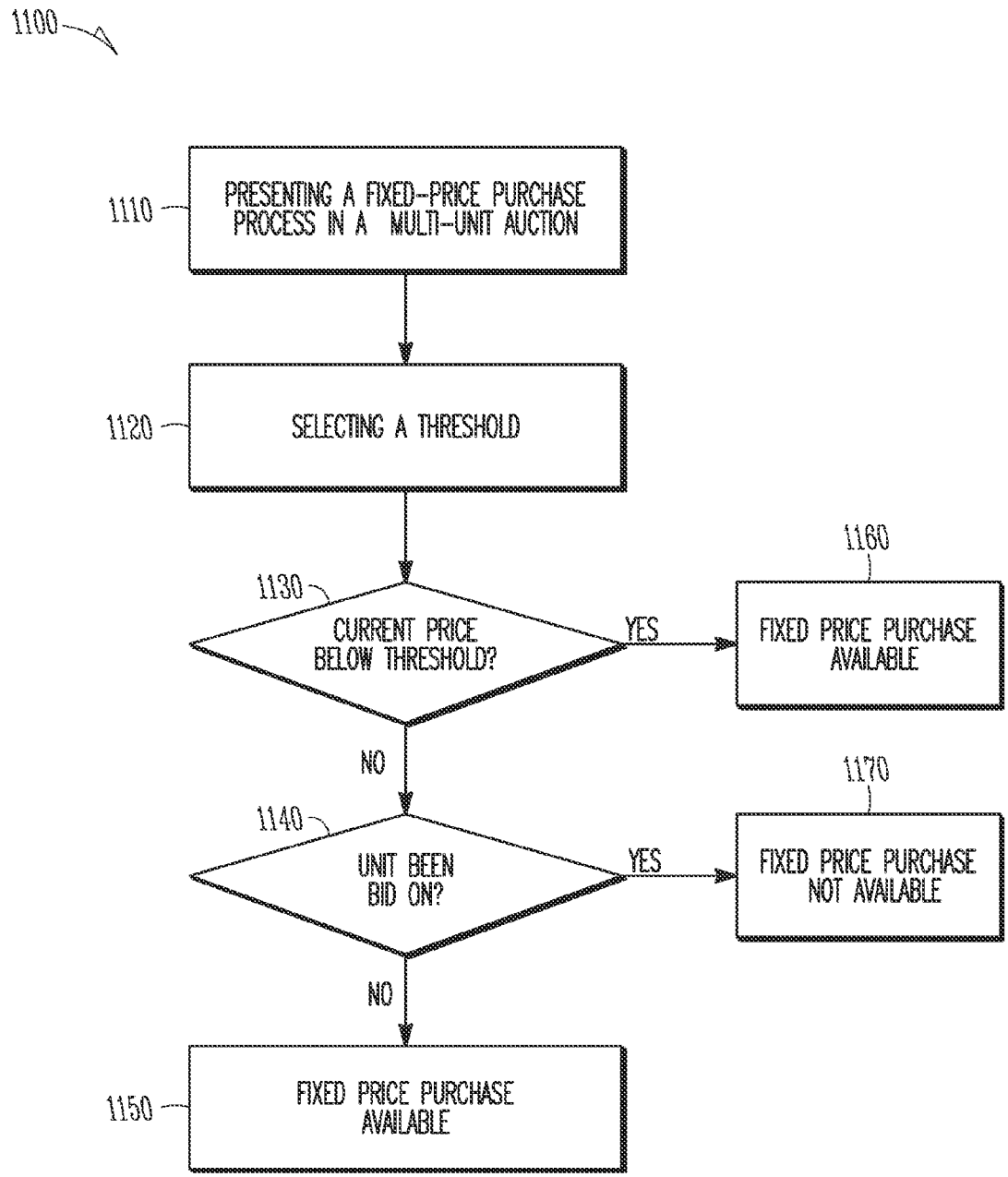
FIG. 11 illustrates an exemplary method maintaining an item available for fixed-price purchase in a multi-unit auction based on the current price, a threshold, and the number of bids on the item.

Another embodiment in of a process 1100 in which the BIN feature disappears during the course of an auction is referred to as a semi-persistent BIN an is illustrated in FIG. 11. In a semi-persistent embodiment of the BIN feature, a fixed-price purchase option is made available in a multi-unit auction at 1110, and a configurable threshold between 0% and 100% inclusive is posited at 1120. Then, units of an item will be available for BIN at 1150 as long as either the current auction price (or the current auction price after bid) is below the threshold at 1130, or, the unit has not yet been bid on at 1140. Otherwise, the fixed-price purchase option will not be available (1160, 1170). The current auction price after bid may be determined by one or more pricing rules. In an embodiment, the current price after bid is set to a low value (such as 1) at the beginning of an auction. As soon as a bidder becomes a partial loser (i.e. the bidder will not receive all the units he has bid on because other bidders have bid higher), the current price after bid is set to the partial loser's maximum bid price. Then, when a bidder becomes a full loser, the current price after bid is set to that bidder's maximum price plus one increment. This is referred to as Vickrey pricing.

Specifically, in an embodiment, the starting price of the auction is set to be less than or equal to the BIN price. The threshold is set to a certain value between 0% and 100% inclusive. When the variable is equal to 100%, the BIN feature is available throughout the auction for that item irrespective of the number of bids on that item. When the variable is equal to 0%, every bid on that item counts and consequently reduces the number of units of that item available for BIN on a one for one basis (i.e., for every unit bid on, the number of units available for BIN is reduced by one). If the number of units that are available for BIN reduces to 0, then in an embodiment the BIN option disappears from the auction.

For example, if the threshold is set to 0% (i.e., every unit bid for will affect the units available for BIN, since the current auction price will always be equal to or greater than 0% of the BIN price), the starting price for an item is 1, the BIN price is 10, and the total number of available units of these items is 10, then an example scenario is as follows:

| Bidder | Number of Units Available for Bid | Number of Units Available for BIN | Number of Units Requested in Bid |
|---|---|---|---|
| A | 10 | 10 | 3 |
| B | 10 | 7 | 6 |
| C | 10 | 1 | 1 |
| D | 10 | 0 | 2 |

As the above table shows, as each bidder requests a number of units for an item in a bid, the number of units of that item available for BIN decreases by the number of units requested in the bid. For example, after bidder A requested three units in a bid, bidder B had available to him for BIN only 7 units of the item. Then, after bidder C placed a bid for one unit, the number of requested bids for that item equaled the total quantity of that item, and the quantity available for BIN was reduced to zero. That is, after bidder C placed a bid, the total number of items with a bid thereon (3, 6, 1) equaled the total quantity of items that were available (10). In an embodiment, the user interface of the auction displays to the user the number of units available for BIN. For example, when bidder B is in the process of bidding, the user interface will indicate that there are 7 units available for BIN, and that if the user would like to exercise the BIN option, the user should enter 7 units or fewer.

In another embodiment, the number of units of an item that are available for BIN always remains the same irrespective of the number of units requested in a bid or bids. For example, in this embodiment, the threshold is set to 100, the start price is 1, the BIN price is 10, and the total quantity of available items is 10 (and assuming that each buyer's maximum bid price is 9). Then, for example, referring to the table below,

| Bidder | Number of Units Available for Bid | Number of Units Available for BIN | Number of Units Requested in Bid |
|---|---|---|---|
| A | 10 | 10 | 3 |
| B | 10 | 10 | 6 |
| C | 10 | 10 | 1 |
| D | 10 | 10 | 2 | it can be seen that irrespective of the number of units requested in a bid by a user, the number of units available for BIN remains the same for the duration of the auction. In this embodiment, the current price after bid, once again assuming that each bidder's maximum bid is 9 (because of a rule that disallows a user from placing a bid equal to or above the BIN price when the threshold is set to 100), will never be equal to or greater than 100% of the BIN price (10). Therefore, BIN will always remain an option in this auction; it will not be removed. In this case, the number of items that have received bids is neglected, and the maximum bid prices for those bids are neglected.

In yet another embodiment, the number of units of an item available for BIN remains constant throughout the bidding process until the current bid price (or current price after bid) is equal to a certain percentage of the BIN price. In an example of this embodiment, the threshold is set to 70, the start price is set to 1, the BIN price is set to 10, the bidding increment is set to 1, and the total quantity available for this item is 10. Then, a sequence of bidders and bids may be as follows:

| Bidder | Max Bid | QABID | QABIN | QRBID | CPAB |
|---|---|---|---|---|---|
| A | 6 | 10 | 10 | 3 | 1 |
| B | 8 | 10 | 10 | 5 | 1 |
| C | 8 | 10 | 10 | 3 | 6 |
| D | 9 | 10 | 10 | 2 | 7 |
| E | 9 | 10 | 0 | 3 | 8 |
| F | 9 | 10 | 0 | 3 | 8 |

Wherein
Max Bid is a Bidder's maximum bid
QABID is the quantity available for bid
QABIN is the quantity available for BIN
QRBID is the quantity requested in a bid
CPAB is the current price after a bid Referring to the above table, Bidder A first bids on three units, Bidder B then bids on five units, and then Bidder C bids on 3 units. At this point, Bidder A has become a partial loser (because the total quantity of units requested in the bids of A, B, and C are now equal to 11, and there are only ten units available for bid). The current price after bid, per Vickrey pricing, is set to six—the maximum bid of Bidder A. Thereafter, Bidder D bids for two units, making Bidder A a full loser, and the current price after bid is set to Bidder A's maximum bid plus one. This raises the current price after bid to seven, which is equal to 70%, or the threshold, of the BIN price. Since the current price after bid now is equal to (or is not below) the threshold percentage of the BIN price, and all units have been bid on (total of units bid on for A, B, C, and D is 13), the BIN option is removed from this particular auction session.

In another example of a situation in which the quantity available for BIN is determined by the current price after bid as a percentage of BIN price, assume that the threshold is set to 80%, the start price is 80, the BIN price is 100, and the number of units available for purchase is 10. The following example illustrates an embodiment of such an example.

| Bidder | Max Bid | QABID | QABIN | QRBID | CPAB |
|---|---|---|---|---|---|
| A | 82 | 10 | 10 | 3 | 80 |
| B | 85 | 10 | 7 | 6 | 80 |
| C | 89 | 10 | 1 | 3 | 82 |
| D | 93 | 10 | 0 | 8 | 89 |
| E | 96 | 10 | 0 | 3 | 93 |

In this example, since the starting price (also the current price after bid in this case) is greater than or equal to the threshold percentage (80%) of the BIN price, every bid and quantity counts. For example, after Bidder A places a bid on three units, the units available for BIN decreases from ten units to seven units. Then, after Bidder C places his bid, the total quantity of units upon which there are outstanding bids is twelve (Bidder A, 3; Bidder B, 6; Bidder C, 3), and the BIN option is removed from the auction.

In an embodiment, an auction system can variably offer a temporary BIN feature, a permanent BIN feature, or a semi-permanent BIN feature. In such an embodiment, the type of the BIN feature may be changed by simply changing a variable in the system that represents the threshold in the system from 0% to 100% inclusive.

Figure 12:
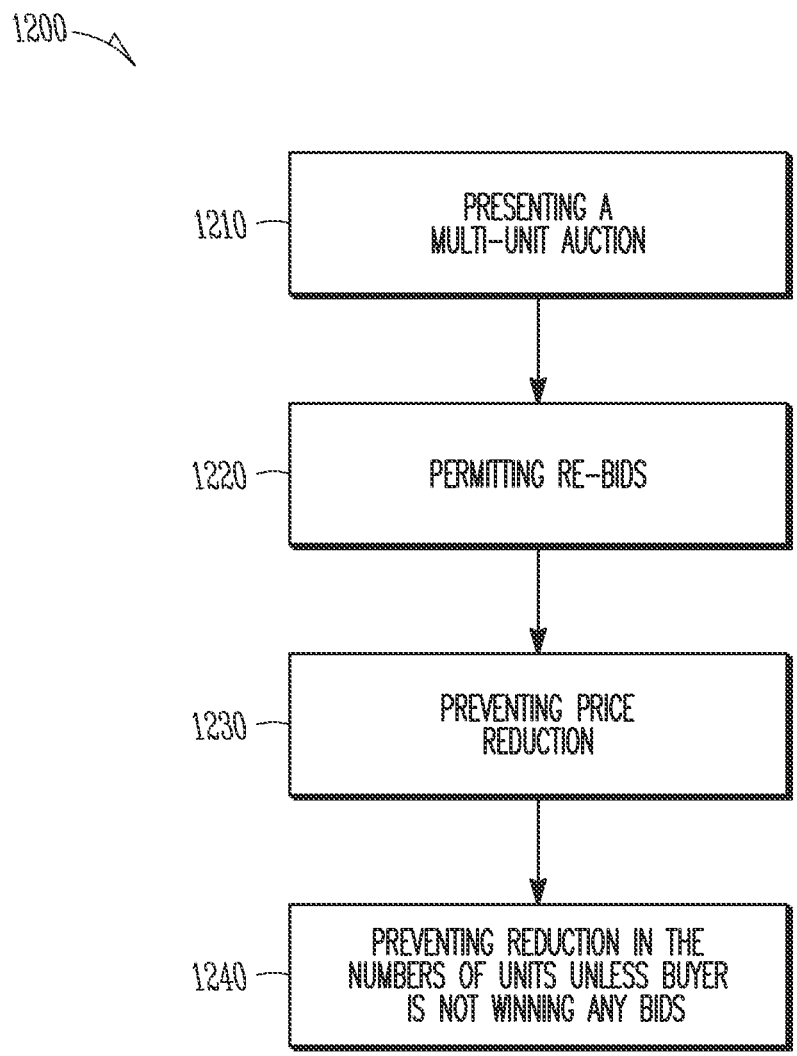
FIG. 12 illustrates an exemplary method of permitting re-bids in a multi-unit auction.

Another embodiment of a multi-unit auction is a process 1200 as illustrated in FIG. 12 that allows bidders to re-bid during the auction. A multi-unit auction is made available to a user at 1210, and re-bidding is permitted at 1220. This re-bid feature is accompanied by rules that prevent downward price movements and associated gaming of the auction system. Specifically, in such an embodiment, a bidder is not allowed to reduce the price in the re-bid at 1230 (compared to the previous bid). Additionally, a bidder in a re-bid is not permitted to reduce the quantity of units of an item in the re-bid at 1240. In another embodiment, there is an exception to the quantity reduction prohibition. That exception is that if a bidder is "fully losing" the auction—i.e. the bidder is currently winning zero units in the auction of a particular item, the bidder may reduce the quantity of an item bid for to a minimum of one unit.

Figure 13:
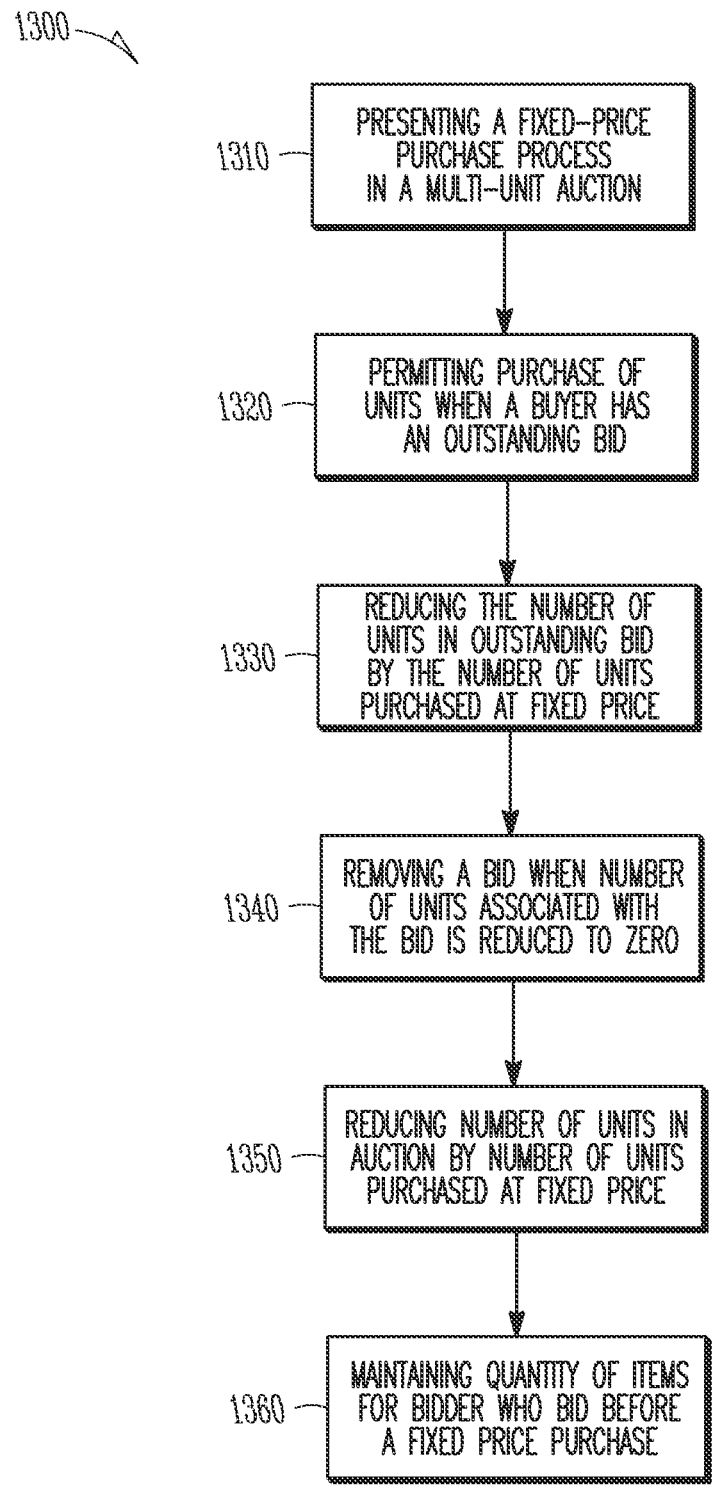
FIG. 13 illustrates an exemplary method of permitting a user to purchase an item at a fixed-price during a multi-unit auction when that user has an outstanding bid.

Another embodiment or an exemplary method 1300 is illustrated in FIG. 13 and further prevents price reductions and associated gaming of multi-unit auctions that permit a BIN feature. In such an embodiment, a fixed-price purchase option is made available (1310), and if a user, who presently has an outstanding bid for X units of an item, decides to buy Y units now (BIN) (1320), that bidder's outstanding bid will be reduced from the X units to a maximum of (X-Y) units or zero units (1330) (i.e. max(X-Y, 0)) (i.e. in general, the person's bid will be reduced by the number of BIN units). Further, that bidder's bid price for the remaining units in the bid will remain the same, and a bid that is reduced to zero units is removed from the system (1340). Additionally, in this embodiment, if a person decides to buy a quantity of units now, the number of units available in the auction will be reduced on a one for one basis (1350). However, another person (not the one who executed the BIN) who bid on X units before a BIN was executed, will still be considered by the system as bidding on X units after the BIN (even if X is now greater than the number of units available in the auction after the BIN) (1360). Moreover, if that person re-bids, he must re-bid for at least X units since he cannot reduce his quantity in a re-bid (unless he becomes a full loser). By comparison, if a new bidder bids on units after the BIN is executed, he will not be permitted to bid for more units than are available after the BIN.

Thus a method and system for providing an option to sell and buy at a pre-auction seller determined price in an Internet-based multi-unit auction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed:

1. A computer-implemented method comprising:
   presenting to a buyer, using a computer processor in a network-based transaction facility, a multi-unit auction;
   permitting said buyer, via said computer processor, to bid one or more of a price and a number of units in said auction; and
   permitting said buyer, via said computer processor, to re-bid in said auction;
   wherein said auction comprises a rule that prevents said buyer from reducing the price in said re-bid; and
   wherein said auction comprises a rule that prevents said buyer from reducing the number of units in said re-bid.

2. The computer-implemented method of claim 1, comprising modifying said rule that prevents said buyer from reducing the number of units in said re-bid such that said buyer is permitted to reduce the number of units in said re-bid when said buyer is not winning any units in said auction.

3. The computer-implemented method of claim 2, wherein said auction comprises a rule that prevents said buyer from reducing said number of units to less than one unit.

4. The computer-implemented method of claim 1, wherein said auction is an online auction.

5. A system comprising:
   one or more computer processors in a network-based transaction facility that are configured to:
   present a buyer a multi-unit auction;
   permit said buyer to bid one or more of a price and a number of units in said auction; and
   permit said buyer to re-bid in said auction;
   wherein said auction comprises a rule that prevents said buyer from reducing the price in said re-bid; and
   wherein said auction comprises a rule that prevents said buyer from reducing the number of units in said re-bid.

6. The system of claim 5, comprising a computer processor configured to modify said rule that prevents said buyer from reducing the number of units in said re-bid such that said buyer is permitted to reduce the number of units in said re-bid when said buyer is not winning any units in said auction.

7. The system of claim 6, wherein said auction comprises a rule that prevents said buyer from reducing said number of units to less than one unit.

8. The system of claim 5, wherein said auction is an online auction.

9. A machine-readable medium storing instructions, which, when executed by a processor, cause the processor to perform a process comprising:
   presenting to a buyer a multi-unit auction;
   permitting said buyer to bid one or more of a price and a number of units in said auction; and
   permitting said buyer to re-bid in said auction;
   wherein said auction comprises a rule that prevents said buyer from reducing the price in said re-bid; and
   wherein said auction comprises a rule that prevents said buyer from reducing the number of units in said re-bid.

10. The machine-readable medium of claim 9, comprising instructions for modifying said rule that prevents said buyer from reducing the number of units in said re-bid such that said buyer is permitted to reduce the number of units in said re-bid when said buyer is not winning any units in said auction.

11. The machine-readable medium of claim 10, wherein said auction comprises a rule that prevents said buyer from reducing said number of units to less than one unit.

12. The machine-readable medium of claim 9, wherein said auction is an online auction.

* * * * *

UNITED STATES PATENT AND TRADEMARK OFFICE
CERTIFICATE OF CORRECTION

| | | |
|---|---|---|
| PATENT NO. | : 8,463,694 B2 | Page 1 of 1 |
| APPLICATION NO. | : 12/689153 | |
| DATED | : June 11, 2013 | |
| INVENTOR(S) | : Erik Anderson Stuart | |

It is certified that error appears in the above-identified patent and that said Letters Patent is hereby corrected as shown below:

In the Claims

In column 10, line 16, in claim 5, before "a", insert --to--, therefor

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,463,694 B2 | Page 1 of 1 |
| APPLICATION NO. | : 12/689153 | |
| DATED | : June 11, 2013 | |
| INVENTOR(S) | : Erik Anderson Stuart | |

It is certified that error appears in the above-identified patent and that said Letters Patent is hereby corrected as shown below:

In the Claims

In column 10, line 16, in claim 5, before "a", insert --to--, therefor (First Occurrence)

This certificate supersedes the Certificate of Correction issued November 11, 2014.

Signed and Sealed this
Ninth Day of December, 2014

Michelle K. Lee
*Deputy Director of the United States Patent and Trademark Office*